US012708908B2

(12) United States Patent
Eberhardt et al.

(10) Patent No.: US 12,708,908 B2
(45) Date of Patent: Aug. 18, 2026

(54) METHODS FOR THE RETRIEVAL OF AGGREGATE FROM WASTE CONSTRUCTION MATERIAL BY GRINDING

(71) Applicant: SIKA TECHNOLOGY AG, Baar (CH)

(72) Inventors: Arnd Bernd Eberhardt, Winterthur (CH); Denise Muths-Kern, Zürich (CH); Lukas Frunz, Dietlikon (CH); Luis Pegado, Brugg (CH); Patrick Juilland, Bernin (CH); Emmanuel Gallucci, Zürich (CH)

(73) Assignee: SIKA TECHNOLOGY AG, Baar (CH)

(*) Notice: Subject to any disclaimer, the term of this patent is extended or adjusted under 35 U.S.C. 154(b) by 298 days.

(21) Appl. No.: 18/289,480

(22) PCT Filed: May 5, 2022

(86) PCT No.: PCT/EP2022/062121

§ 371 (c)(1),
(2) Date: Nov. 3, 2023

(87) PCT Pub. No.: WO2022/238225

PCT Pub. Date: Nov. 17, 2022

(65) Prior Publication Data

US 2024/0238801 A1 Jul. 18, 2024

(30) Foreign Application Priority Data

May 10, 2021 (EP) .................................... 21173122

(51) Int. Cl.
*B02C 17/20* (2006.01)
*B03B 9/06* (2006.01)

(52) U.S. Cl.
CPC .............. *B03B 9/065* (2013.01); *B02C 17/20* (2013.01)

(58) Field of Classification Search
CPC ....... B02C 17/00; B02C 17/007; B02C 17/04; B02C 17/10; B02C 17/20; B02C 17/205; B03B 9/065
See application file for complete search history.

(56) References Cited

U.S. PATENT DOCUMENTS

| | | | | |
|---|---|---|---|---|
| 11,807,724 | B2 * | 11/2023 | Luthe | B02C 17/00 |
| 2015/0210594 | A1 | 7/2015 | Achenbach | |
| 2021/0122898 | A1 | 4/2021 | Luthe et al. | |

FOREIGN PATENT DOCUMENTS

| | | | |
|---|---|---|---|
| CN | 108164171 | A | 6/2018 |
| CN | 109516703 | A | 3/2019 |
| CN | 110028290 | A | 7/2019 |
| EP | 3 656 750 | A2 | 5/2020 |
| EP | 3744700 | A1 | 12/2020 |
| JP | H10272449 | A | 10/1998 |
| JP | 2000-197876 | A | 7/2000 |
| JP | 3199622 | B2 | 8/2001 |
| JP | 2003-164772 | A | 6/2003 |
| JP | 2005-008465 | A | 1/2005 |
| KR | 10-0650135 | B1 | 11/2006 |
| WO | 2014/040852 | A1 | 3/2014 |
| WO | 2014/154741 | A1 | 10/2014 |

OTHER PUBLICATIONS

Blott et al., "Particle shape: a review and new methods of characterization and classification," Sedimentology, 2008, vol. 55, pp. 31-63.
Sep. 5, 2022 International Search Report issued in International Patent Application No. PCT/EP2022/062121.
Sep. 5, 2022 Written Opinion of the International Searching Authority issued in International Patent Application No. PCT/EP2022/062121.

* cited by examiner

*Primary Examiner* — Matthew Katcoff
(74) *Attorney, Agent, or Firm* — Oliff PLC

(57) ABSTRACT

Methods for the retrieval of aggregates from waste construction material by grinding in a ball mill or on a compressive grinder, which are useful in the recycling of waste construction material, especially in the recycling of concrete or mortar. Also, cleaned aggregates obtained from waste construction material by grinding and their use on the production of new construction materials.

9 Claims, No Drawings

METHODS FOR THE RETRIEVAL OF AGGREGATE FROM WASTE CONSTRUCTION MATERIAL BY GRINDING

TECHNICAL FIELD

The present invention relates to methods for the retrieval of aggregates from waste construction material by grinding. Methods of the present invention are useful in the recycling of waste construction material, especially in the recycling of concrete or mortar. The present invention also relates to cleaned aggregates obtained from waste construction material by grinding and to their use on the production of new construction materials.

STATE OF THE ART

Up to date, a large amount of waste construction material, such as e.g. hardened concrete, mortar, plaster or the like, is disposed in landfills and minor quantities are partially reused in low-tech applications in the construction industry.

Current practice is that waste construction material, e.g. concrete from demolition, is crushed and only the coarse fractions are being reused, the smaller ones being discarded due to compromising effect on the properties of fresh and hardened concrete. Therefore, current practice can only be considered incomplete and down-cycling.

However, waste construction material usually comprises significant amounts of useful constituents, e.g. aggregates or binder components, which can in principle completely be recycled and re-used for new construction works. Moreover, in certain regions and countries the disposal of wastes has become more and more expensive and difficult due to new legislations. Thus, recycling of waste construction material is an important issue.

During recycling of waste construction material, it is of high importance that aggregates contained in such waste construction material are cleaned from any cementitious or other materials adhering to or mixed into such aggregates. A very good cleaning of aggregates, or in other words a removal of any adhering cementitious or binder material from aggregates, may significantly improve the re-use of such aggregates in the making of new construction material, e.g. fresh concrete or mortar. In particular, it should be possible to completely replace fresh aggregate by recycled aggregate from waste construction materials in case where such aggregates are sufficiently cleaned.

State-of-the-art recycling of waste construction material and especially of mixed construction waste typically requires some steps of sorting, for example manually sorting or automated separation by optical detection and blow out. Such sorting needs additional time and often is inefficient.

JP 3199622 discloses a method where aggregate is regenerated from concrete by crushing and sieving to remove any hardened cement adhering to the aggregate.

WO 2014/154741 as well as WO 2014/040852 disclose processes for the recycling of construction waste. Therein, construction waste is carbonated and crushed to yield cleaned aggregates and also mineral powders which can, for example, be reused for the formulation of cementitious materials such as concrete or mortar. It has also been described in WO 2014/154741 (p. 11, l. 1-23) that the crushing or disintegration of the construction waste during carbonation is important to remove the carbonated material from aggregates quickly and to efficiently obtain clean aggregates.

However, aggregates obtainable from state-of-the-art recycling processes of waste construction materials are typically not clean enough. This means, that such aggregates still carry significant amounts of cementitious materials or other binders. The use of such aggregates which are not clean enough in the production of e.g. concrete or mortar may compromise the properties of the final products. This may even be more problematic in case where the binder adhering to the aggregates is not cementitious but, for example, gypsum. Especially, the tendency for shrinkage and the cracking tendency as well as the creep properties are often lower than the designed values when such incompletely cleaned aggregates are used. Recycling of mixed construction waste to retrieve aggregates thus is especially problematic. It is therefore currently not allowed to replace 100% of aggregates in concrete compositions by recycled aggregates from waste construction materials.

The cleaning of aggregate in the recycling of waste construction material is thus of highest importance. There is still a need to improve the processes during the recycling of waste construction material to obtain cleaned aggregates and to further improve the overall efficiency of the recycling process.

SUMMARY OF THE INVENTION

It is an object of the present invention to provide improved methods for the retrieval of aggregates from waste construction material. Especially, it is an object of the present invention to provide methods for the recycling of waste construction material to yield cleaned aggregates.

Surprisingly, the objects of the present invention were achieved by a method as claimed in claim 1.

Thus, the present invention relates to a method for the retrieval of aggregates from waste construction material comprising a step of grinding the waste construction material, characterized in that the grinding is done in a semi-autogeneous mill or on a compressive grinder.

The waste construction material is separated in cleaned aggregates and a powdery material by a method of the present invention. It can be advantageous if a method of the present invention involves grinding in the presence of carbon dioxide.

Methods of the present invention surprisingly lead to a more efficient cleaning of aggregates during the recycling of waste construction material. Especially, the aggregates obtained by a method of the present invention carry a lower amount of binder, especially of cementitious materials, as compared to aggregates obtained by a state-of-the-art process. Additionally, the sieve line and the particle shape of aggregates obtained by a method according to the present invention is optimized. This allows for an optimal usage of such aggregates in the production of fresh construction materials, especially in concretes or mortars. Also, the replacement levels of original aggregates by recycled aggregates of the present invention can be very high. Finally, overall efficiency of a recycling process of waste construction material is improved by a method of the present invention which is apparent from a higher specific powder abrasion per time unit in the grinding step.

Further aspects of the present invention are the subject of independent claims. Preferred embodiments of the present invention are the subject of dependent claims.

Ways of Carrying Out the Invention

In a first aspect the present invention relates to a method for the retrieval of aggregates from waste construction material, said method comprising a step of grinding the waste construction material, characterized in that the grinding is done in a semi-autogeneous mill or on a compressive grinder.

Within the present context the term waste construction material refers to any construction material comprising aggregates and which is not intended for its original purpose. Waste construction material especially is surplus material, off-spec material, returned material or demolition waste. Especially, the waste construction material is demolition waste. The waste construction material within the present context contains aggregates and at least one binder but is otherwise not limited in its composition. Especially, the waste construction material may be based on different binders, inorganic or organic. According to preferred embodiments, the waste construction material comprises at least one aggregate and at least one mineral, hydraulic binder. Mineral, hydraulic binders are for example, cements, gypsum, lime, clays, latent hydraulic binders, pozzolanes, and geopolymers.

Cements can in particular be cements, especially Portland cements and slag cements, as described in standard EN 197-1, calcium aluminate cements as described in standard EN 14647, and/or calcium sulfoaluminate cements. The term "gypsum" is meant to encompass $CaSO_4$ in various forms, in particular $CaSO_4$ anhydrite, $CaSO_4$ $\alpha$- and $\beta$-hemihydrate, and $CaSO_4$ dihydrate. The term "lime" is meant to encompass natural hydraulic lime, formulated lime, hydraulic lime, and air lime as described in the standard EN 459-1:2015. Clays can be any swelling clays or non-swelling clays. Especially "clay" within the present context is meant to be a burnt clay material, preferably brick. Pozzolanes and latent hydraulic materials preferably are selected from the group consisting of calcined clay, especially metakaolin, slag, kiln dust, microsilica, fly ash, zeolite, rice husk ash, burnt oil shale, and natural pozzolane such as pumice and trass. Geopolymers are alumo-siliceous polymers. One particular example of a geopolymer is furnace slag activated with water glass.

According to embodiments, the waste construction material is a waste material selected from the group consisting of cement-based materials such as concrete and mortar, aereated concrete, gypsum-based materials such as screed, plaster, and stucco, sand limestone, porous filling materials such as foamed glass, vermiculite, pumice and perlite, or clay-based materials such as bricks. It is possible that the waste construction material is a mix of different materials. For example, the waste construction material can be concrete or mortar, mixtures of concrete and gypsum-based materials, mixtures of concrete and plaster, mixtures of brick and mortar, mixtures of brick, mortar, and plaster, etc. metal fibers, especially steel fibers, polymer fibers, and/or glass may also be contained in waste construction material. It is, however, preferred, that the waste construction material does not contain large pieces of metals or wood.

It is possible by a method of the present invention to also separate steel fibers and/or polymer fibers from waste construction material. A steel fiber and/or polymer fiber may thus be regarded as being an aggregate within the present context.

According to especially preferred embodiments, the waste construction material is waste concrete, especially waste concrete from demolition.

The waste construction material can be pre-treated before being put to a method of the present invention. Pre-treatment is especially the crushing of waste construction material and/or the sorting according to materials. Where crushing is performed, it is preferred that the size of crushed material is bigger than the particle size of the biggest aggregate.

Aggregates within the present context are any materials that are non-reactive in the hydration reaction of mineral, hydraulic binders. Typical aggregates are for example rock, crushed stone, gravel, slag, sand, especially quartz sand, river sand and/or manufactured sand, foundry sand, glass, expanded glass, hollow glass beads, glass ceramics, volcanic rock, pumice, perlite, vermiculite, quarry wastes, raw, fired or fused earth or clay, porcelain, electrofused or sintered abrasives, firing support, silica xerogels, thermoplastics, thermosetting plastics, elastomers, rubbers, textiles fibers, plastic materials reinforced with glass or carbon fibres, fillers from the treatment of excavation sludge, sewage sludge, slurry paper waste, paper incineration ashes, household waste incineration ashes, and/or fine aggregates such as ground limestone, ground dolomite, and/or ground aluminum oxide.

According to especially preferred embodiments, aggregates are selected from the group consisting of gravel and sand.

It is particularly preferred that aggregates conform to standard EN 12620:2013.

Aggregates may have various particle sizes and particle shapes. Typically, aggregates of the present invention are characterized by a particle size distribution or sieve line. The particle size distribution can be determined by sieve analysis as described in standard EN 933-1. It is preferred that the particle size distribution of aggregates is according to standard EN 12620:2013. The particle shape may be expressed in terms of flakiness, flow coefficient, shape index, sphericity or circularity. Flakiness can be determined according to standard EN 933-3. Shape index can be determined according to standard EN 933-4. Flow coefficient can be determined according to standard EN 933-6. Sphericity or circularity can be determined as explained in a paper by Blott et al. (S. J. Blott, K. Pye, *Particle shape: a review and new methods of characterization* in *Sedimentology* (2008) 55, 31-63.). Aggregates, obtained in a method of the present invention are also referred to as "cleaned aggregates" throughout this invention.

The powdery material obtained in methods of the present invention in particular comprises calcite, amorphous silica, amorphous aluminum hydroxide, and aluminates. It can for example be used as filler and/or as supplementary cementitious material (SCM) in binder compositions and/or as raw material for cement production. Depending on the element oxide composition of the powdery material it may be used for different purposes. For example, where the element oxide composition is similar to the one of hydraulic, mineral binders, the powdery material can be used as filler or SCM for concrete or mortars. For example, where additional calcium sulfate is contained, the powdery material can be used for the sulfatation of mineral binders. The powdery material has particle sizes ranging from nanometers to several micrometers. Typically, the particle size of the powdery material is in the range of 0-0.250 mm or 0-0.125 mm determined by sieve analysis as described in standard EN 933-1. This facilitates the separation of the powdery material from the cleaned aggregates.

The method of the present invention can be practiced on attrition mills. Especially suitable attrition mills are semi-autogeneous mills and compressive grinders.

A compressive grinder within the present context is a type of grinder able to exert a compressive force on a bed of material to be ground. Preferably, the compressive force is exerted by rotating cylinders or a rotor-stator. A compressive grinder can for example be a crusher or a roller mill. According to embodiments, the compressive grinder is a vertical roller mill, a horizontal roller mill, or jar crusher with controllable, adjustable compression.

According to embodiments, the compression force exerted onto the bed of waste construction material can be adjusted to predefined values. Additionally preferably, the residence time can be adjusted through direct adjustment or circulation of the material to be treated.

Examples for a semi-autogeneous mill is a ball mill or an agitation mill. According to embodiments, in a method of the present invention, the grinding is done in a ball mill or in an agitation mill.

Preferably, depending on the type of waste construction material and aggregates, the grinding parameters of a method of the present invention are adjusted to ensure efficient cleaning of the aggregates without destroying said aggregates.

According to especially preferred embodiments, in a method of the present invention, the grinding is done in a ball mill or in an agitation mill, preferably a ball mill, where the filling degree of the mill is not higher than 60%, preferably not higher than 50% more preferably not higher than 40%, still more preferably not more than 33%, especially not higher than 25%, in each case based on the volume of the mill.

It has been found that the cleaning of aggregates is more efficient when the filling degree of a ball mill or agitation mill is lower. However, if the degree of filling is too low, the overall process efficiency is decreased. Preferably, the filling degree is not lower than 5%, more preferably not lower than 10%, in each case based on the total volume of the mill. Generally, the degree of filling must be increased when the density of the grinding media is increased.

According to further embodiments, in a method of the present invention, the grinding is done in a ball mill or in an agitation mill, preferably a ball mill, and the mass ratio of waste construction material to grinding media is in the range of 0.2 to 3, preferably 0.2 to 1. It has been found that the cleaning of aggregates is less efficient when the mass ratio of waste construction material to grinding media is higher than 3, preferably higher than 2, more preferably higher than 1. Generally, the mass ratio of waste construction material to grinding media should be higher when grinding media of a higher density is used and should be lower when grinding media of a lower density is used.

According to embodiments, the grinding is done in a ball mill or in an agitation mill, preferably a ball mill, and the volume ratio of waste construction material to grinding media is not higher than 1.

According to further embodiments, in a method of the present invention, the grinding is done in a ball mill or an agitation mill, preferably a ball mill, and the grinding media is selected from balls, rods, pebbles, or pieces of steel, zirconium oxide, aluminum oxide, ceramics, natural stone, concrete, or mortar, preferably of concrete or mortar.

According to embodiments, the grinding media has a diameter which is slightly larger than the targeted maximum grain size of the aggregates to be retrieved in a method of the present invention. In case where pieces of steel are used as grinding media, these may take the form of chains or chain segments where each chain segment has an inner diameter which is slightly larger than the targeted maximum grain size of the aggregates. This has the advantage that after consummation of the steel grinding media, a minimum of such grinding media residues are carried out through the mill outlet, since the outlet typically has a sieve holding back material larger than the defined maximum grain size of the retrieved aggregates.

It is especially preferable to use pieces of cured concrete or mortar as grinding media. Preferably, the pieces of cured concrete or mortar are of the same waste construction material which is to be treated in a method of the present invention and are larger pieces obtained from pre-crushing of the waste construction material. Pieces of cured concrete or mortar to be used as grinding media preferably have a diameter of 10-40 cm, more preferably 10-30 cm, especially 15-30 cm. The pieces can be of regular shape or irregular shape. The density of concrete or mortar used as grinding media can be 2.2-2.5 g/cm$^3$. A higher density, for example 2.7 or 3.0, is also possible. It is also preferred that the concrete or mortar used as grinding media has a high hardness. The use of concrete or mortar as grinding media in the grinding of waste construction materials has the advantage that no detrimental impurities are introduced during the grinding. In case of steel used as grinding media it is possible that due to abrasion pieces of steel are mixed with the aggregate after grinding which leads to the need of additional separation steps. This is not the case where concrete or mortar is used as grinding media because abrasion would only lead to further aggregates and powdery material being released.

According to further embodiments, in a method of the present invention the grinding is done in a ball mill or an agitation mill, preferably a ball mill, and the grinding media has a minimum size which is larger than the maximum particle size of the aggregate to be retrieved. It has been found that where the grinding media is smaller than the maximum particle size of the aggregate to be retrieved, aggregate particles with a size larger than the size of the grinding media are destroyed. It is, for example, possible to use pieces of concrete with an average diameter of 5 cm or bigger, especially of 10 cm, 20 cm or 40 cm, in a method for the retrieval of aggregate with a particle size between 0-32 mm.

The residence time of the waste construction material in the mill is controlled by the grinding time where the grinding is done in a batch process, by the agitation cycles in a semi-continuous process, or by the material input flow where the grinding is done in a continuous process. The residence time can, for example, be controlled by partial blocking of the outlet of the grinding zone in a continuous process or temporary blockage of the outlet of the grinding zone in a semi-continuous or batch process. The residence time can be controlled to optimize overall process efficiency as well as cleaning efficiency of the aggregates. The residence time can also be controlled to optimize the particle size distribution of aggregates obtained in a method of the present invention.

It is also possible to control the rotational velocity of a semi-autogenous mill, especially a ball mill, to optimize the grinding efficiency.

According to embodiments, where the grinding is done in a semi-autogeneous mill and a grinding media of high density is used, the filling degree of the mill is not higher than 60%, preferably not higher than 50%, more preferably not higher than 30%, and not lower than 10%, preferably not lower than 15%, in each case based on the total volume of the mill, and the mass ratio of waste construction material to grinding media is between 0.2-3, preferably 0.5-2, and the residence time is between 15-45 min. High density within the present context is a density of >6 g/ml, preferably >7 g/ml. One example for a grinding media of high density are steel balls.

According to embodiments, where the grinding is done in a semi-autogeneous mill and a grinding media of low density is used, the filling degree of the mill is not higher than 40%, more preferably not higher than 30%, and not lower than 5%, in each case based on the total volume of the mill, and the mass ratio of waste construction material to grinding media is between 0.2-3, preferably 0.5-2. Low density within the present context is a density of 2-6 g/ml, preferably 2-5 g/ml, and the residence time is between 10-60 min. One example for a grinding media of low density are pieces of concrete or mortar as described above. Another example for a grinding media of low density are ceramic balls.

It is possible, and in certain cases also preferred, that a grinding aid is added in a method of the present invention. The present invention therefore also relates to a method as described above, characterized in that a grinding aid is added before and/or during the grinding of the waste construction material.

Grinding aids are known to the person skilled in the art. They may, for example, be selected from grinding aids typically used for the grinding of cement clinker.

According to embodiments, the grinding aid is selected from the group consisting of polycarboxylate ethers, alkanolamines, sugars, sugar acids, hydrogenated sugars, super absorbent polymers, glycols, glycerol, calcium formiate, and mixtures thereof.

Suitable alkanolamines are preferably selected from the group consisting of monoethanolamine, diethanolamine, triethanolamine (TEA), diethanolisopropanolamine (DEIPA), ethanoldiisopropanolamine (EDIPA), isopropanolamine, diisopropanolamine, triisopropanolamine (TIPA), N-methyldiisopropanolamine (MDIPA), N-methyldiethanolamine (MDEA), tetrahydroxyethylethylenediamine (THEED), and tetrahydroxyiso-propylethylenediamine (THIPD), as well as mixtures of two or more of these alkanolamines. It is also possible to use salts of these alkanolamines.

Examples of suitable glycols are monoethylene glycol, diethylene glycol, triethylene glycol, tetraethylene glycol, pentaethylene glycol, polyethylene glycol, in particular with 6 or more ethylene units, e.g. PEG 200, neopentyl glycol, hexylene glycol, propylene glycol, dipropylene glycol and polypropylene glycol. It is also possible to use mixtures of two or more different glycols as well as of at least one glycol and glycerine.

In one embodiment, the glycerol is a so-called bio-glycerine, which can be produced from a renewable raw material.

In particularly preferred embodiments of the present invention, at least one polycarboxylate ether (PCE) is used as the grinding aid. Accordingly, in these embodiments, the grinding aid comprises or consists essentially of at least one PCE. PCEs of the present invention comprise (i) repeating units A of the general structure (I), (I)

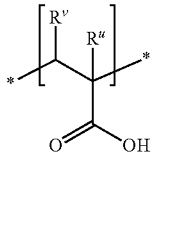

and (ii) repeating units B of the general structure (II), (II)

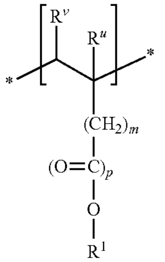

where each Ru independently represents hydrogen or a methyl group, each Rv independently represents hydrogen or COOM, wherein M independently is H, an alkali metal, or an alkaline earth metal, m=0, 1, 2 or 3, p=0 or 1 each R1 is independently —$(CH_2)_z$—$[YO]_n$—R4, where Y is a C2 to C4 alkylene and R4 is H, C1 to C20 alkyl, -cyclohexyl, -alkylaryl, or a —N(—$R_i)_j$—$[(CH_2)_z$—$PO_3M]_{3-j}$, z=0, 1, 2, 3, or 4, preferably 0, n=2-350 preferably 30-200, particularly preferably 35-200, especially 40-110, j=0, 1 or 2, $R_i$ represents a hydrogen atom or an alkyl group having 1-4 carbon atoms, and M represents a hydrogen atom, an alkali metal, an alkaline earth metal or an ammonium ion, and wherein the repeating units A and B in the PCE have a molar ratio of A:B in the range of 10: 90-90:10.

In a further preferred embodiment, z=0. In a further preferred embodiment, z=4.

In a particularly preferred embodiment, the PCE comprises repeating units A of the general structure (I) as well as repeating units B of the general structure (II), the molar ratios of A to B being in the range of 20: 80-80:20, more preferably 30:70-80:20, in particular 35: 65-75:25.

A PCE preferably has an average molar mass Mw in the range of 1,000-1,000,000, more preferably 1,500-500,000, most preferably 2,000-100,000, in particular 3,000-75,000 or 3,000-50,000 g/mol. The molar mass Mw is determined in the present case by gel permeation chromatography (GPC) with polyethylene glycol (PEG) as standard. This technique is known per se to the skilled person.

PCEs according to the invention can be random or non-random copolymers. Non-statistical copolymers are in particular alternating copolymers or block or gradient copolymers or mixtures thereof.

According to embodiments, only one type of PCE is used as grinding additive, optionally in a mixture with at least one further grinding additive which is not a PCE. According to further embodiments, two or more types of PCE are used as grinding additive, optionally in a mixture with at least one further grinding additive which is not a PCE.

A "sugar" in the sense of the present invention is a carbohydrate having an aldehyde group. In particularly preferred embodiments, the sugar belongs to the group of monosaccharides or disaccharides. Examples of sugars include, but are not limited to, glyceraldehyde, threose, erythrose, xylose, lyxose, ribose, arabinose, allose, altrose, glucose, mannose, gulose, idose, galactose, tallose, fructose, sorbose, lactose, maltose, sucrose, lactulose, trehalose, cellobiose, chitobiose, isomaltose, palatinose, mannobiose, raffinose and xylobiose. Sugars can also be used in form of e.g. vinasse, molasse.

A "sugar acid" in the context of the present invention is a monosaccharide having a carboxyl group. It may belong to any of the classes of aldonic acids, ursonic acids, uronic acids or aldaric acids. Preferably, it is an aldonic acid. Examples of sugar acids useful in connection with the present invention include, but are not limited to, glyceric acid, xylon acid, gluconic acid, ascorbic acid, neuraminic acid, glucuronic acid, galacturonic acid, iduronic acid, tartaric acid, mucilic acid and saccharic acid. The sugar acid may be in the form of the free acid or as a salt. According to embodiments, salts of sugar acids may be salts with metals of groups Ia, IIa, Ib, IIb, IVb, VIIIb of the periodic table of elements. Preferred salts of sugar acids are salts of alkali metals, alkaline earth metals, iron, cobalt, copper or zinc. Especially preferred are salts with monovalent metals such as lithium, sodium and potassium.

A hydrogenated sugar especially is a hydrogenated starch hydrolysate or a hydrogenated glucose syrup. Hydrogenated sugars are produced by the partial hydrolysis of oligo- and polysaccharides which are subsequently hydrogenated. The result is a mixture of sugar alcohols.

The term "superabsorbent polymers" refers to polymers that can absorb large amounts of water. When superabsorbent polymers come into contact with water, the water molecules diffuse into the cavities of the polymer network and hydrate the polymer chains. The polymer can thus swell and form a polymer gel or slowly dissolve. This step is reversible, so the superabsorbent polymers can be regenerated to their solid state by removing the water. The water absorption property is denoted by the swelling ratio, by which is meant the ratio of the weight of a swollen superabsorbent polymer to its weight in the dried state. The swelling ratio is influenced by the degree of branching of the superabsorbent polymer, any crosslinking that may be present, the chemical structure of the monomers that form the superabsorbent polymer network, and external factors such as the pH, ion concentration of the solution, and temperature. Because of their ability to interact with water, superabsorbent polymers are also referred to as hydrogels.

Examples of superabsorbent polymers useful in the context of the present invention include but are not limited to natural polymers, such as starch, cellulose, such as cellulose ether, chitosan or collagen, alginates, synthetic polymers, such as poly(hydroxyethyl methacrylate), poly(ethylene glycol) or poly(ethylene oxide) or ionic synthetic polymers, such as polyacrylic acid (PAA), polymethacrylic acid (PMAA), polyacrylamides (PAM), polylactic acid (PLA), polyethyleneimine, polyvinyl alcohol (PVA) or polyvinylpyrrolidone.

Superabsorbent polymers that are particularly suitable in the context of the present invention are ionic superabsorbent polymers, in particular those based on polyacrylamide modified with acrylic acid, which can be of either linear or crosslinked structure.

Grinding aids may be added in a total amount of 0.01-10 w %, preferably 0.05-5 w %, especially 0.08-1 w %, relative to the total dry weight of the waste construction material.

A method of the present invention may additionally comprise a step of carbonation of the waste construction material.

The term "carbonation" is used in the present context for the reaction of mineral binder, in particular hardened mineral binder, with $CO_2$. For example, hardened cement of the CEM I type carbonates by reaction with $CO_2$ from the ambient air. In particular, calcium carbonate is formed. The progressive carbonation of mineral binder, in particular of hardened mineral binder, can be measured by a drop in the pH value.

In particular, "carbonation" as used herein means the incorporation of carbon dioxide into chemical compounds or the chemical reaction of carbon dioxide with the parent material. Thus, "carbonation" specifically means a reaction of the starting material with carbon dioxide. Carbonation of cured mineral binders, such as mortars or concrete, occurs naturally to some extent. However, the term "carbonation" is used here to refer to a process in which carbonation is deliberately enhanced or accelerated compared to the natural process. This can be achieved by providing excess carbon dioxide.

For example, a hardened mineral binder in the form of hydraulic cement, consisting essentially of calcium, silicate and aluminum hydrates, can react with carbon dioxide to form corresponding carbonates.

Basically, the microstructure of the hardened mineral binder or binder matrix determines the rate of carbonation and the course of a carbonation front from the exposed surface of the cementitious material to its core.

It has been found that by carbonating the waste mineral construction material the cleaning of aggregates becomes much more efficient. This is because the carbonated mineral binder is easier to be removed from the surface of aggregates.

The progress of carbonation can be determined, for example, by measuring the $CO_2$ partial pressure in a method according to the present invention. If the $CO_2$ partial pressure decreases, carbonation takes place. If the $CO_2$ partial pressure does not decrease further, substantially complete carbonation can be assumed. Alternatively, the progress of carbonation can be determined, for example, by measuring the pH. If the pH decreases carbonation is occurring. If the pH does not drop further, then essentially complete carbonation can be assumed. This is usually the case at a pH of 7-10, preferably 7-9.

It is possible to carbonate the waste construction material prior and/or during the grinding step. It is, however, preferred that the carbonation takes place during the grinding step. This is because, the carbonated material will be removed from the aggregates during grinding more easily thereby releasing fresh, uncarbonated surfaces which can in turn be carbonated and removed more easily. The cleaning of aggregates is thus achieved particularly efficiently.

According to embodiments, the carbonation of the waste construction material is effected during the grinding of said waste construction material.

Especially, the carbonation is effected at a level of $CO_2$ which is at or above the concentration present in the atmosphere. Especially, the carbon dioxide is introduced during grinding together with the process air. It is especially preferably to adjust the $CO_2$ level in the process air to a level above the concentration present in the standard atmosphere and which is sufficient to fully carbonate all carbonateable material in the waste construction material within the desired residence time of the waste construction material in the semi-autogeneous mill or the compressive grinder.

During carbonation, a minimum of moisture is required in the waste construction material and/or in the process air to enable carbonation of the waste construction material.

According to embodiments, the humidity of the process air in the grinding zone is between 0% to 100%, preferably 30% to 90% relative humidity. It is preferred to limit the relative humidity in the grinding zone, to avoid the agglomeration of the powdery material obtained. The humidity of the process air can be adjusted to the humidity of the waste construction material. According to embodiments, the process air has a lower relative humidity when the waste construction material is wet. In such cases, the process air can be used to dry the waste construction material to avoid unwanted agglomerations. It is, however, also possible to run a method of the present invention at higher humidity and even in a water bath, e.g. where the waste construction material is introduced in the semi-autogenous mill or the compressive grinder in form of a slurry or paste. Preferably, the method of the present invention is run at temperatures above 0° C., more preferably above 20° C. It is further preferred to run a method of the present invention at temperatures which are not higher than 100° C., preferably not higher than 80° C.

It is preferred that fines and/or the powdery material are removed from the grinding zone during grinding. This will increase grinding efficiency. The removal preferably is done continuously, for example by blowing air through the grinding zone.

The method of the present invention may additionally comprise a step of separating the cleaned aggregates and the powdery materials. According to embodiments, separation is effected at a predefined cut-off particle size in order to retrieve recycled, cleaned aggregates with a particle size of at least the predefined cut-off particle size and/or in order to retrieve powdery material with a particle size below the predefined cut-off particle size. According to further embodiments, it is also possible to separate the cleaned aggregates into fractions of different particle size.

According to embodiments, fractions of different particle size are fractions of 0.063-4 mm, 4-8 mm, and 6-16 mm. Other fractions of different particle size are 0.063-4 mm, 4-16 mm, and 16-32 mm. Still other fractions of different particle size are 0-2 mm, 2-8 mm, 8-16 mm or 8-32 mm. Still other fractions of different particle size are 0-4 mm, 4-8 mm, 8-16 mm, 16-32 mm. Still other fractions of different particle size are 0.063-0.125 mm, 0.125-0.25 mm, and 0.25-0.355 mm. Still other fractions of different particle size are 0.08-0.16 mm, 0.16-0.50 mm, 0.50-1.0 mm, 1.0-1.60 mm, and 1.60-2.0 mm. Still other fractions of different particle size are 63-300 μm, 100-600 μm, 500-1200 μm, 900-1500 μm.

It is possible to abbreviate particle size fractions, for example a particle size fraction of 4-8 mm is also abbreviated as "4/8".

According to embodiments, separation is done by filtration, sieving, sedimentation, density separation, wind sifting, e.g. in cyclones, and/or centrifugation.

The method of the present invention can be done in a batch process or in a continuous process.

In a second aspect, the present invention relates to aggregates obtained in a method as described above. The aggregates obtained have low amounts of adhering materials or no adhering materials, especially low amounts of or no adhering binder. The amount of adhering binder, especially mineral binder, or the degree of cleaning of the aggregates can be determined by a measurement of their water absorption according to standard EN 1097-6. Adhering mineral binder will increase the water absorption of aggregates. Thus, cleaning of aggregates can be considered to be sufficient if the water absorption is close to or is the same as the water absorption of the same fresh aggregate. Within the present context the term "the same fresh aggregate" always refers to the respective aggregate which has never been used as aggregate in a construction material. For example, fresh aggregate is sand from a sand pit or a river which has never been used in a concrete or mortar. According to preferred embodiments, the difference between the water absorption of the cleaned aggregate and the water absorption of the fresh aggregate is not more than 300%, preferably not more than 200%, more preferably not more than 150%, especially not more than 100% of the water absorption of the same fresh aggregate.

Especially, the difference between the water absorption of the cleaned aggregate and the water absorption of the fresh aggregate is not more than 300%, preferably not more than 200%, more preferably not more than 150%, especially not more than 100% of the water absorption of the same fresh aggregate, where the aggregates belong to the fractions with particle size of 4-8 mm, 8-16 mm, and/or 16-32 mm.

A particular advantage of aggregates obtained by a method of the present invention is that they are particularly clean and round. The roundness of particles can for example be described in terms of sphericity or circularity as explained in a paper by Blott et al. (S. J. Blott, K. Pye, *Particle shape: a review and new methods of characterization in Sedimentology* (2008) 55, 31-63.). The circularity as measured according to the method by Cox as described in the paper by Blott is especially suitable. An aggregate retrieved by a method of the present invention has a circularity as measured by the method of Cox of higher than 0.70, preferably higher than 0.73, more preferably higher than 0.76.

Especially, aggregates of the present invention are more round as compared to aggregates retrieved from simply crushing of raw materials, e.g. rock or waste construction material. This is due to the friction exerted on the edges of aggregates during the grinding. Aggregates of the present invention might also be more round as compared to naturally occurring aggregates, e.g. sand.

Another way of measuring the roundness is the determination of the particle shape—shape index according to standard EN 933-4:2008.

Another particular advantage of aggregates obtained by a method of the present invention is that they have a particle size distribution which is very steady. This means that the particle size distribution curve (which is a plot of the amount of particles of a given size vs the particle size) steadily increases from very small particle sizes to very big particle sizes. Especially preferred, there is only one inflection point in the particle size distribution curve.

Such aggregates may also be referred to as cleaned aggregates.

The fineness of aggregates of the present invention depends on their particle size. Thus, a given fraction of particle sizes will have a given fineness. The fineness of aggregates can, for example, be measured by the Blaine method as described in standard EN 196-6:2010. According to embodiments, the Blaine fineness of an aggregate according to the present invention is not less than 1000 $cm^2/g$. For example, the Blaine fineness of an aggregate of the present invention of the particle size fraction 0/4 is not less than 1000 $cm^2/g$.

It is to be understood that any embodiments as described above and where applicable also relate to this aspect of the invention.

In a third aspect the present invention relates to the use of aggregates obtained in a method as described above in the production of construction materials, especially mortar or concrete.

The aggregates obtained in a method as described above, also called "cleaned aggregates", typically have a lower water absorption as compared to other aggregates. A lower water absorption is desirable in the production of construction materials because the use of less water typically leads to higher strength of the cured material. It may also be possible to reduce the amount of binder, especially of cement, in the construction material when cleaned aggregates of the present invention are used and still obtain the desired strength because mixing water needed for a desired workability can be reduced. Water absorption of aggregates can be measured according to standard EN 1097-6:2013-09.

The construction material within the present context contains aggregates and at least one binder but is otherwise not limited in its composition. Especially, the construction material may be based on different binders, inorganic or organic. According to preferred embodiments, the construction material comprises at least one aggregate and at least one mineral, hydraulic binder. Mineral, hydraulic binders are for example, cements, gypsum, lime, clays, latent hydraulic binders, pozzolanes, and geopolymers. Such binders are as described above.

Construction materials within the present context optionally also contain fine fillers and/or and least one additive selected from the group consisting of plasticizers, superplasticizers, shrinkage reducers, air entrainers, deaerating agents, stabilizers, viscosity modifiers, water reducers, accelerators, retarders, water resisting agents, strength enhancing additives, fibres, blowing agents, defoamers, redispersible polymer powders, chromate reducers, pigments and steel passivating agents.

It is to be understood that any embodiments as described above and where applicable also relate to this aspect of the invention.

In a fourth aspect, the present invention relates to a construction material, preferably a concrete or a mortar, comprising at least a binder and an aggregate obtained in a method as described above, characterized in that the aggregates obtained in a method as described above make up at least 30 w %, preferably at least 50 w %, more preferably at least 75 w %, still more preferably at least 90 w %, especially at least 99 w % of the total weight of aggregates.

A typical construction material of the present invention comprises or consists of (in each case relative to the total weight of the construction material)

a) 10-75 w %, preferably 15-60 w %, of a binder, preferably a mineral, hydraulic binder, especially a binder selected form the group consisting of cements, gypsum, lime, clays, latent hydraulic binders, pozzolanes, geopolymers, or mixtures thereof,
b) 15-90 w %, preferably 25-75 w % of aggregate,
c) optionally 0.1-10 w % of at least one additive, and
d) optionally water, characterized in that at least 30 w %, preferably at least 50 w %, more preferably at least 75 w %, still more preferably at least 90 w %, especially at least 99 w % of the total weight of aggregates are aggregates obtained in a method of the present invention.

It is to be understood that any embodiments as described above and where applicable also relate to this aspect of the invention.

In a fifth aspect, the present invention relates to a method of reducing the water demand of construction materials, especially mortar or concrete, said method comprising a step of replacing fresh aggregate by aggregates obtained in a method as described above.

A reduction of water demand can be measured as an increase in slump flow as measured according to standard EN 12350-5:2019-09 and/or a reduction in funnel flow time as measured in accordance with standard EN 12350-9:2010-12.

A method for reducing the water demand of construction materials, especially mortar or concrete, therefore is identical to a method for the increase of slump flow and/or the reduction of funnel flow time of construction materials, especially mortar or concrete.

According to embodiments, the replacement level of fresh aggregate by aggregates obtained in a method as described above in a method of reducing the water demand of construction materials, especially mortar or concrete, is at least 30 w %, preferably at least 50 w %, more preferably at least 75 w %, still more preferably at least 90 w %, especially at least 99 w % of the total weight of aggregates.

It is to be understood that any embodiments as described above and where applicable also relate to this aspect of the invention.

In a sixth aspect, the present invention relates to a method of reducing the content of binder in construction materials, especially the content of cement in a mortar or concrete, while keeping a constant strength, said method comprising a step of replacing fresh aggregate by aggregates obtained in a method of the present invention.

It is especially preferred that the binder is a cement selected from Portland cements and slag cements, as described in standard EN 197-1, calcium aluminate cements as described in standard EN 14647, and/or calcium sulfoaluminate cements.

Especially, in a method of reducing the content of binder in construction materials, especially the content of cement in a mortar or concrete, while keeping a constant strength, such strength relates to the compressive strength measured after full hardening of the construction material, especially the compressive strength after 28d of hardening.

According to embodiments, the replacement level of fresh aggregate by aggregates obtained in a method as described above in a method of reducing the content of binder in construction materials, especially the content of cement in a mortar or concrete, while keeping a constant strength, is at least 30 w %, preferably at least 50 w %, more preferably at least 75 w %, still more preferably at least 90 w %, especially at least 99 w % of the total weight of aggregates.

It is to be understood that any embodiments as described above and where applicable also relate to this aspect of the invention.

The invention will be further explained by way of example. The examples are not meant to limit the invention to any particular embodiments.

EXAMPLES

The following table 1 shows an overview of chemicals used.

TABLE 1

| Raw materials used | |
|---|---|
| PCE-1 | Co(poly-acrylate-poly-methacrylate) with Mn = 5000 g/mol and methoxy-terminate dpolyethylenoxide side chain (Mn = 3000 g/mol); molar ratio carboxylate:side chain = 4.5 |

TABLE 1-continued

| Raw materials used | |
|---|---|
| PCE-2 | Co(poly-acrylate-poly-methacrylate) with Mn = 5000 g/mol and methoxy-terminated polyethylenoxide side chain (Mn = 1000 g/mol); molar ratio carboxylate:side chain = 0.8 |
| PCE-3 | Co(poly-acrylate-poly-methacrylate) with Mn = 5000 g/mol and methoxy-terminated polyethylenoxide side chain (Mn = 500 g/mol); molar ratio carboxylate:side chain = 1.0 |
| PCE-4 | Copolymer of methallylalcohol started polyethylenoxide (Mn = 2400 g/mol), acrylic acid, and 2-hydroxyethylacrylate with a molar ratio of 0.625:0.416:2.80 |
| $Ca(HCOO)_2$ | Calcium formiate; Sigma-Aldrich (>99%) |
| Melasse | Untreated melasse from sugar production from raw sugar (solid content appr. 80 Gew.-%; pH = 5.5) |
| TIPA | Triisopropanolamine, Sigma-Aldrich (95%) |

Trial 1—Aggregate Retrieval

The waste construction material used was a pre-crushed concrete from demolition (with primary aggregate sand and gravel 0-32 mm).

A ball mill with a diameter of 60 cm and a length of 50 cm was used.

For milling operations, waste construction material was introduced into the mill together with the grinding media as indicated in below tables. Grinding was effected for 30 min at medium speed. Grinding was done at 20° C. and a relative humidity of the process air of 75%.

Additional grinding aids, where present, were dosed with a total amount of 0.125 w % relative to the waste construction material. Carbonation, where used, was effected by introducing $CO_2$ into the mill with the process air (6% $CO_2$ in process air).

Sieve line of aggregates was determined as described in standard EN 933-1.

The following table 2 shows an overview of the examples done.

TABLE 2

Examples (all examples according to the present invention)

| Example | Grinding media | Mass ratio*[2] | Filling degree*[3] | Additional |
|---|---|---|---|---|
| 1 | Steel balls | 1 | 17% | None |
| 2 | Ceramic balls | 1 | 17% | None |
| 3 | Concrete*[1] | 1 | 17% | None |
| 4 | Concrete*[1] | 1 | 25% | None |
| 5 | Concrete*[1] | 1 | 33% | None |
| 7 | Concrete*[1] | 0.5 | 25% | None |
| 8 | Concrete*[1] | 2 | 25% | None |
| 9 | Concrete*[1] | 1 | 33% | carbonation |
| 10 | Concrete*[1] | 1 | 25% | carbonation PCE-1 & PCE-3 (weight ratio 1:1) |
| 11 | Concrete*[1] | 1 | 25% | carbonation PCE-1 & PCE-3 & TIPA (weight ratio 1:1:0.4) |
| 12 | Concrete*[1] | 1 | 25% | carbonation PCE-4 & $Ca(HCOO)_2$ |
| 13 | Concrete*[1] | 1 | 25% | carbonation molasse & PCE-2 (weight ratio 2:1) |
| 14 | Concrete*[1] | 1 | 25% | PCE-3 & PCE-1 (weight ratio 1:1) |

*[1]pieces of fully cured concrete (irregular shape, appr. 20 cm diameter)

*[2]mass ratio of waste construction material: grinding media in the mill

*[3]% of total mill volume

The following table 3 shows an overview of the results obtained.

TABLE 3

Results (examples 1-14 according to the present invention)

| Expl. | Cleaning efficiency*[4] | Specific powder abrasion*[5] | Sieve line of aggregate*[6] [% passing] 0.063 mm | 0.125 mm | 0.5 mm | 1 mm | 2 mm | 4 mm | 8 mm | 16 mm |
|---|---|---|---|---|---|---|---|---|---|---|
| 1 | 58% | 74 | 21 | 31 | 41 | 42 | 43 | 46 | 70 | 78 |
| 2 | 56% | 41 | 11 | 17 | 24 | 26 | 29 | 35 | 63 | 72 |
| 3 | 54% | 38 | 8 | 16 | 24 | 28 | 32 | 41 | 55 | 82 |
| 4 | 43% | 27 | 9 | 12 | 19 | 23 | 30 | 39 | 66 | 74 |
| 5 | 37% | 23 | 6 | 9 | 15 | 19 | 26 | 36 | 65 | 73 |
| 7 | 58% | 46 | 12 | 17 | 28 | 33 | 40 | 49 | 72 | 80 |
| 8 | 37% | 19 | 6 | 9 | 13 | 16 | 22 | 31 | 63 | 72 |
| 9 | 63% | 30 | 5 | 9 | 19 | 24 | 31 | 39 | 64 | 68 |
| 10 | 75% | 54 | 12 | 17 | 33 | 39 | 45 | 51 | 60 | 74 |
| 11 | 75% | 49 | 12 | 17 | 31 | 37 | 43 | 50 | 60 | 75 |
| 12 | 70% | 53 | 11 | 15 | 29 | 35 | 42 | 49 | 58 | 72 |
| 13 | 77% | 59 | 11 | 16 | 31 | 36 | 42 | 48 | 58 | 71 |
| 14 | 73% | 49 | 11 | 16 | 30 | 36 | 42 | 49 | 59 | 73 |

*[4]cleaning of aggregate determined as water absorption; water absorption of aggregate determined according to EN 1097-6. The percentages given are relative to untreated waste construction material which was set at 0%.

*[5]in w %/hour

*[6]32 mm maximum particle size in all cases (100% passing)

The circularity of aggregates retrieved by the inventive method was between 0.73-0.80 when measured according to the method of Cox as described in the paper by Blott cited above. The circularity of the aggregate retrieved from pre-crushing and not treated in a method by the present invention was 0.68. The circularity of the same type of aggregate but never used to make a construction material was 0.8.

A comparison of examples 1-3 shows that the use of steel balls as grinding media leads to especially high cleaning efficiency and specific powder abrasion. However, there is a risk of contamination with abraded steel of the aggregates obtained when using steel balls as grinding media. In addition, a larger amount of small particles with a size <0.063 mm resulted. The use of ceramic balls also leads to satisfying results. The amount of very small particles was significantly lower and the particle size distribution steadier as compared to the grinding with steel balls which is beneficial. Surprisingly, the use of concrete pieces as grinding media also led to very satisfying results that are comparable to the use of ceramic balls (cf examples 2 and 3). However, in case of concrete pieces used as grinding media, there is no risk of unwanted contamination of the aggregates obtained.

A comparison of examples 3-5 shows that an increase in the filling degree leads to a lower cleaning efficiency and also a lower specific powder abrasion. Lower cleaning efficiency and lower specific powder abrasion is unwanted. Nevertheless, a higher degree of filling in the mill leads to a higher material throughput at the same residence time, thus leading to improved overall process efficiency. The filling degree must thus be chosen to enable a compromise between cleaning efficiency and material throughput. The aggregates obtained tend to be coarser when the filling degree is higher.

A comparison of examples 4, 7, and 8 shows that an increase in mass ratio of waste construction material to grinding media in the mill reduces the cleaning efficiency and the specific powder abrasion. Reduced cleaning efficiency and reduced specific powder abrasion is unwanted. Nevertheless, if the mass ratio of waste construction material:grinding media becomes too low, material throughput and thus overall process efficiency might be too low. This mass ratio must thus be chosen to enable a compromise between cleaning efficiency and material throughput. The aggregates obtained tend to be coarser when this mass ratio is increased.

Example 9 shows that carbonation leads to an increase in specific powder abrasion (compare to example 5). Also, the aggregates obtained tend to be finer when grinding is done with carbonation.

Finally, examples 10-14 show that the method for retrieving aggregates can be additionally improved by the addition of grinding aids. This can be seen for example from the specific powder abrasion which is higher for examples 10-14 as compared to examples 5 or 9.

The following table 4 shows the results of the water absorption. Water absorption was measured according to standard EN 1097-6:2013-09.

The gravel used as a reference was fresh crushed gravel used as received.

TABLE 4

Water absorption of cleaned aggregate (examples 1-14 according to the present invention)

| | Water absorption of aggregate with particle size of | | | |
|---|---|---|---|---|
| Example | 0.063-4 mm | 4-8 mm | 8-16 mm | 16-32 mm |
| Gravel | 0.9 | 0.8 | 0.8 | 0.7 |
| Untreated waste construction material | 12.0 | 8.0 | 6.0 | 3.0 |
| 1 | 2.30 | 1.90 | 2.79 | 2.48 |
| 2 | 2.82 | 2.01 | 2.94 | 2.29 |
| 3 | 4.58 | 3.10 | 2.13 | 1.87 |
| 4 | 4.95 | 2.58 | 2.68 | 2.85 |
| 5 | 6.09 | 2.65 | 2.33 | 3.31 |
| 7 | 4.52 | 1.98 | 1.99 | 2.36 |
| 8 | 5.60 | 2.88 | 3.17 | 2.57 |
| 9 | 8.49 | 3.62 | 2.89 | 2.41 |
| 10 | 5.92 | 2.78 | 1.63 | 1.19 |
| 11 | 5.20 | 2.38 | 1.90 | 1.30 |
| 12 | 5.70 | 2.40 | 1.80 | 1.68 |
| 13 | 5.62 | 2.29 | 1.59 | 1.27 |
| 14 | 5.57 | 2.37 | 1.89 | 1.47 |

Similar observations can be made as discussed for the results of table 3. Especially it can be seen from the results of table 4, that aggregates retrieved from a method of the present invention have much lower water absorption as compared to untreated waste construction material. A lower water absorption of the aggregates is beneficial as this will allow to formulate cementitious materials, especially concrete or mortar, with less mixing water and thus higher strength. It can also be seen that at least for the particle size groups 4/8, 8/16, and 16/32, the cleaned aggregate has a water absorption which is similar to the water absorption of fresh gravel of the same particle size group. For the particle size group 0.063/4 the observed differences are bigger which may be due to the presence of fine ground mineral powder resulting from the binder in this particle size group.

Trial 2—Tests in Mortar

Aggregates retrieved in a method of the present invention were tested in a mortar formulation. The dry mortar was composed of CEM II/B-LL and aggregates in the amounts as indicated in below table 5. Aggregate used was either sand, untreated waste construction material, or aggregate retrieved in a method of the present invention as indicated in below table 5. Dry mortar was mixed with water to realize a water:binder ratio of 0.4. Mixing was done on a Hobart mixer for 3 min. A commercial polycarboxylate superplasticizer (SikaViscoCrete 3088 available from Sika Schweiz AG), was added together with the mixing water tin an amount of 1 w % relative to the binder content.

All aggregates used were water saturated. The grading curve of any aggregate used was as follows:

| | Particle size [mm] | | | | | | |
|---|---|---|---|---|---|---|---|
| | 0.063 | 0.125 | 0.250 | 0.50 | 1.0 | 2.0 | 4.0 |
| Vol-% passing | 0% | 6.7% | 15.8 | 28.2 | 45.1 | 68.3 | 100 |

The Blaine fineness of such a coarse grading cannot be measured with meaningful results.

The following table 5 shows an overview of the examples realized and the results measured. Slump flow was measured according to standard EN 12350-5:2019-09. The funnel flow time was measured in accordance with standard EN 12350-9:2010-12.

TABLE 5

Aggregate testing in mortar (examples 2-3 and 2-6 are according to the present invention)

| Example | CEM II/ B-LL [Vol-%] | Aggregate [Vol-%] | Aggregate (type) | Slump flow [mm] | Funnel flow time [s] |
|---|---|---|---|---|---|
| 2-1 | 56.9 | 43.1 | Sand | 218 | 3.6 |
| 2-2 | 56.7 | 43.3 | CDW*[1] | 162 | 4.8 |
| 2-3 | 56.3 | 43.7 | Aggregate*[2] | 228 | 3.1 |
| 2-4 | 54.1 | 45.9 | Sand | 240 | 2.8 |
| 2-5 | 53.9 | 46.1 | CDW*[1] | 198 | 3.1 |
| 2-6 | 53.9 | 46.1 | Aggregate*[2] | 276 | 2.4 |

*[1]CDW: waste construction material, untreated

*[2]Aggregate: aggregate retrieved in a method of the present invention

It can be seen from the above table 5, that when aggregates retrieved by a method of the present invention are used in a mortar formulation, this mortar formulation has an increased slump flow and a reduced funnel flow time as compared to the same mortar but where untreated sand or untreated waste construction material is used. This is the case when the grading curve of the respective aggregates are the same. An increased slump flow and/or a reduced funnel flow time are indicative for a lower water demand. The amount of mixing water in a formulation with aggregates retrieved by a method of the present invention can be reduced to adapt this formulation to the same rheology of a formulation using e.g. standard sand. A reduced amount of mixing water is desirable as this will lead to increased strength of the cured formulation. Similarly, the amount of cement and water can be reduced in a formulation using aggregates retrieved by a method of the present invention to achieve the same rheology and strength as a formulation using e.g. standard sand. By this high level of original sand replacement are possible and/or cement savings can be realized.

Trial 3—Tests in Mortar

Tests of aggregates obtained in a method of the present invention were conducted as follows: 750 g cement (CEM I 42.5N), 141 g limestone filler (Nekafill 15 from Netstal AG), and 2999 g aggregates (sand, concrete demolition waste and/or aggregate according to the present invention respectively) were mixed in the dry state for 1 minute in a Hobart mixer. The aggregates added were of the type as indicated in below table 6. The mass ratios of aggregates used are also given in below table 6. Then water was added to realize a water to cement ratio of 0.46. The mixing water contained PCE-1 in an amount of 0.6 w % relative to the cement. Then mixing was continued for 3 minutes. Slump flow was measured according to standard EN 12350-5:2019-09 after the times indicated in below table 6. All aggregates used were water saturated.

The grading curve of any aggregate used was as follows:

| | Particle size [mm] | | | | | | | |
|---|---|---|---|---|---|---|---|---|
| | 0.063 | 0.125 | 0.250 | 0.50 | 1.0 | 2.0 | 4.0 | 8.0 |
| w % passing | 0.1 | 0.4 | 1.6 | 6.9 | 16.2 | 27.4 | 43.9 | 95.7 |

TABLE 6

Aggregate testing in mortar (examples 3-3 and 3-5 are according to the present invention)

| | Example | | | | |
|---|---|---|---|---|---|
| | 3-1 | 3-2 | 3-3 | 3-4 | 3-5 |
| Sand | 100 | 70 | 70 | 50 | 50 |
| CDW*[1] | 0 | 30 | 0 | 50 | 0 |
| Aggregate*[2] | 0 | 0 | 30 | 0 | 50 |
| Slump flow @ 0 min [mm] | 205 | 135 | 204 | 121 | 195 |
| Slump flow @ 30 min [mm] | 206 | 131 | 202 | 118 | 205 |
| Slump flow @ 60 min [mm] | 204 | 128 | 200 | 116 | 196 |
| Slump flow @ 90 min [mm] | 202 | 118 | 195 | 110 | 196 |
| Slump flow @ 120 min [mm] | 194 | 116 | 191 | 110 | 192 |

*[1]CDW: waste construction material, untreated

*[2]Aggregate: aggregate retrieved in a method of the present invention

It can be seen from the results in above table 6 that at a replacement level of fresh aggregate of 30 w % by aggregates obtained in a method of the present invention no significant changes in the slump flow are observed (cf examples 3-1 and 3-3). Hence, replacement at such level is possible without taking any further measures. To the contrary, where untreated waste construction material of the same grading is used, a significant loss of slump flow is observed when 30 w % of fresh aggregate are replaced by such untreated waste construction material (cf examples 3-1 and 3-2).

At a replacement level of fresh aggregate of 50% by aggregates obtained in a method of the present invention, the changes in slump flow observed are acceptable for typical applications (cf example 3-1 and 3-5). When untreated waste construction material of the same grading is used significantly lower slump flow results (cf examples 3-1 to 3-4).

The invention claimed is:

1. A method for retrieval of aggregates from waste construction material, the method comprising a step of grinding the waste construction material, wherein:

the waste construction material comprises at least one aggregate and at least one mineral, hydraulic binder;

the grinding is done in a ball mill or in an agitation mill; and a mass ratio of waste construction material to grinding media is 0.2:1 to 3:1.

2. A method as claimed in claim 1, wherein a filling degree of the mill is not higher than 60%, based on a volume of the mill.

3. A method as claimed in claim 1, wherein the grinding media is selected from balls, rods, pebbles, or pieces of steel, zirconium oxide, aluminum oxide, ceramics, natural stone, concrete, or mortar.

4. A method as claimed in claim 1, wherein the grinding media has a minimum size which is larger than a maximum particle size of the aggregate to be retrieved.

5. A method as claimed in claim 1, wherein a grinding aid is added before and/or during the grinding of the waste construction material.

6. A method according to claim 5, wherein the grinding aid is selected from the group consisting of polycarboxylate ethers, alkanolamines, sugars, sugar acids, hydrogenated sugars, super absorbent polymers, glycols, glycerine, calcium formiate, and mixtures thereof.

7. A method as claimed in claim 5, wherein the grinding aid is added in an amount of 0.01-10 w %, relative to a total dry weight of the waste construction material.

8. A method as claimed in claim 1, wherein the method additionally comprises a step of carbonation of the waste construction material.

9. A method as claimed in claim 8, wherein the carbonation of the waste construction material is effected during the grinding of the waste construction material.

* * * * *